United States Patent
Kang

(10) Patent No.: US 7,674,554 B2
(45) Date of Patent: Mar. 9, 2010

(54) ANODE ACTIVE MATERIAL, METHOD OF PREPARING THE SAME, AND ANODE AND LITHIUM BATTERY CONTAINING THE ANODE ACTIVE MATERIAL

(75) Inventor: Dae Joon Kang, Suwon-si (KR)

(73) Assignee: Samsung SDI Co., Ltd., Suwon-si (KR)

( * ) Notice: Subject to any disclaimer, the term of this patent is extended or adjusted under 35 U.S.C. 154(b) by 0 days.

(21) Appl. No.: 12/212,997

(22) Filed: Sep. 18, 2008

(65) Prior Publication Data
US 2009/0208847 A1    Aug. 20, 2009

(30) Foreign Application Priority Data
Feb. 15, 2008    (KR) .................. 10-2008-0014018

(51) Int. Cl.
*H01M 4/58* (2006.01)
(52) U.S. Cl. ............... 429/231.5; 429/209; 429/233; 252/182.1; 427/58; 427/123; 427/126.3
(58) Field of Classification Search ............ 429/231.5, 429/209, 233; 252/182.1; 427/58, 123, 126.3
See application file for complete search history.

(56) References Cited

U.S. PATENT DOCUMENTS
6,187,689 B1    2/2001    Tabara ................... 438/738
2008/0246000 A1    10/2008    Sakaguchi et al. ....... 252/186.1

*Primary Examiner*—Laura S Weiner
(74) *Attorney, Agent, or Firm*—Stein McEwen, LLP

(57) ABSTRACT

An anode active material including a titanium-based (Ti-based) oxide core and a coating of a titanium oxynitride formed on the Ti-based oxide core, and an anode and lithium battery including the anode active material.

19 Claims, 6 Drawing Sheets

ANODE ACTIVE MATERIAL, METHOD OF PREPARING THE SAME, AND ANODE AND LITHIUM BATTERY CONTAINING THE ANODE ACTIVE MATERIAL

CROSS-REFERENCE TO RELATED PATENT APPLICATION

This application claims the benefit of Korean Patent Application No. 2008-14018, filed on Feb. 15, 2008, in the Korean Intellectual Property Office, the disclosure of which is incorporated herein in its entirety, by reference.

BACKGROUND OF THE INVENTION

1. Field of the Invention

Aspects of the present invention relate to an anode active material, a method of preparing the same, and an anode and a lithium battery employing the anode active material.

2. Description of the Related Art

Non-aqueous electrolyte secondary batteries, in which a lithium compound is used in an anode, have a high voltage and a high energy density, and thus, are used in various applications. Devices such as electric vehicles (HEV, PHEV) and the like require lithium batteries that can be charged and discharged at high rates, in order to insure short charging times.

Metallic lithium has been researched as an anode material, because batteries containing metallic lithium have a high capacity. However, metallic lithium is unstable and highly reactive, and thus, is sensitive to heat or impacts and has a risk of explosion. When an anode including metallic lithium is charged, a large amount of dendritic lithium is deposited on the surface of the metallic lithium. Thus, charging and discharging efficiencies are reduced, and the anode may be disconnected from a cathode.

A carbonaceous anode (rocking chair type anode) performs redox reactions, such that lithium ions in an electrolytic solution intercalate/deintercalate with crystalline graphenes of the anode. A carbonaceous anode is porous, and thus, there is little change in the volume of the carbonaceous anode during charging and discharging. This results in high battery stability. However, a battery using a carbonaceous anode has a low battery capacity, because of the relatively high porosity of the carbonaceous anode. For example, graphite, which is a highly crystalline material, has a theoretical capacity density of about 372 mAh/g, when in the form of $LiC_6$. This density is only about 10% of that of metallic lithium, i.e., 3860 mAh/g. In addition, the flat-band voltage, of the carbonaceous anode during charging, is close to 0 V with respect to a cathode formed of metallic lithium. Thus, a large amount of metallic lithium is deposited on the surface of the anode, during high-rate charging and discharging.

A titanium-based (Ti-based) oxide anode, for example $TiO_2$, $Li_4Ti_5O_{12}$, or the like, has a flat-band voltage of 1V, or more, during charging and discharging, with respect to a cathode formed of metallic lithium. Thus, a Ti-based oxide anode is suitable for high-rate charging and discharging. However, a Ti-based oxide anode has a low conductivity and poor cycle-life characteristics.

SUMMARY OF THE INVENTION

Aspects of the present invention provide an anode active material including a titanium-based (Ti-based) oxide core and titanium oxynitride formed on at least a portion of the surface of the Ti-based oxide core.

Aspects of the present invention also provide a method of preparing the anode active material, including reacting a Ti-based oxide with a nitrogen precursor gas.

Aspects of the present invention also provide an anode including the anode active material and a lithium battery including the anode.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the exemplary embodiments, taken in conjunction with the accompanying drawings, of which.

DETAILED DESCRIPTION OF THE EXEMPLARY EMBODIMENTS

Figure 1:
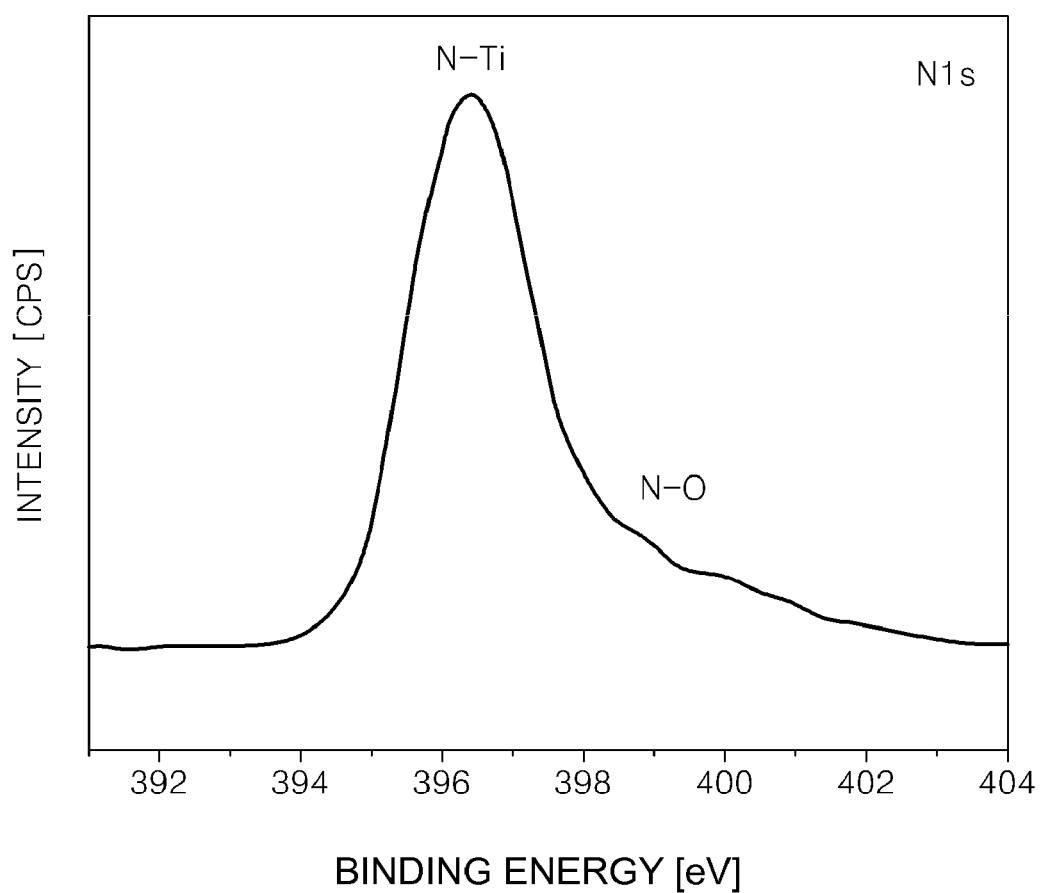
FIG. 1 is a graph showing X-ray photoelectron spectroscopy (XPS) test results of an anode active material prepared in Example 1.

Reference will now be made in detail to the exemplary embodiments of the present invention, examples of which are illustrated in the accompanying drawings, wherein like reference numerals refer to the like elements throughout. The exemplary embodiments are described below, in order to explain the aspects of the present invention, by referring to the figures.

Aspects of the present invention provide an anode active material including a titanium-based (Ti-based) oxide core (i.e., Ti-based oxide core particles) and a titanium oxynitride formed on at least a portion of the surface of each of the Ti-based oxide core particles. The titanium oxynitride has a high conductivity, good solidity, and a high thermal stability. Thus, the titanium oxynitride can compensate for the low conductivity of the Ti-based oxide core. When the anode active material is used in a battery, the battery can have improved high rate discharge characteristics. In addition, during charging and discharging of the battery, the flat-band voltage is increased, the over-potential is decreased, and the capacity of the battery is increased.

The titanium oxynitride may be formed on a portion of the surface, or the entire surface, of the Ti-based oxide core. When the titanium oxynitride is formed on the entire surface of the Ti-based oxide core, the titanium oxynitride can be referred to as a coating layer.

According to another exemplary embodiment of the present invention, the Ti-based oxide may be $TiO_2$, $Li_{4+x}Ti_5O_{12}$ (−0.3<x<0.3), or a mixture thereof. However, the present invention is not limited to the above examples, as the Ti-based oxide may be any suitable Ti-based oxide.

The Ti site of $Li_{4+x}Ti_5O_{12}$ may be doped with at least one element selected from the group consisting of Mg, Al, V, and Nb, at 10 at % (atomic percent). The atomic percent may be calculated using Equation 1 below.

Atomic percent=[number of atoms doped in Ti site/ total number of atoms existing in Ti site]×100   <Equation 1>

Figure 2:
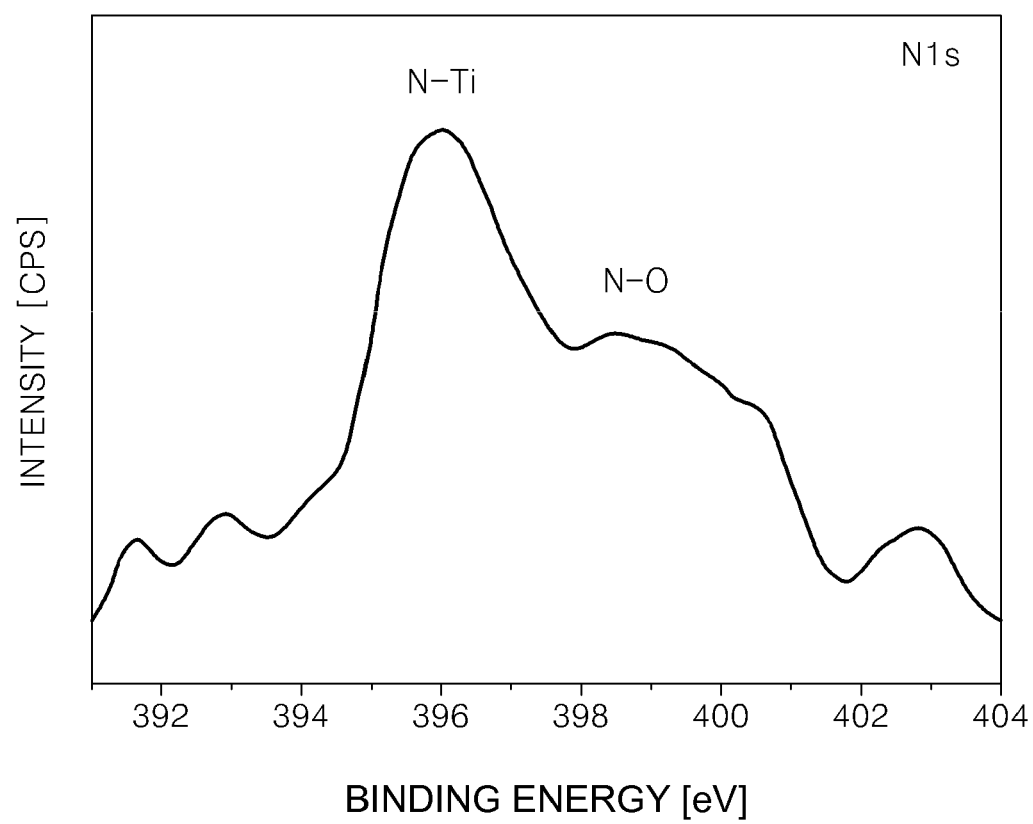
FIG. 2 is a graph showing XPS test results of an anode active material prepared in Example 4.

According to another exemplary embodiment of the present invention, the titanium oxynitride shows peaks corresponding to Ti—N bonds and N—O bonds, during X-ray photoelectron spectroscopy (XPS). FIGS. 1 and 2 respectively show XPS nitrogen spectra of $TiO_2$ and $Li_4Ti_5O_{12}$, which have titanium oxynitride on surfaces thereof. The N—Ti and N—O peaks confirm the presence of the titanium oxynitride on the surface of the Ti-based oxide core.

According to another exemplary embodiment of the present invention, the titanium oxynitride may be represented by Formula 1 below:

$TiO_yN_z$ (1<y<2, and 0<z<1)   <Formula 1>

Aspects of the present invention also provide a method of preparing the anode active material, the method including reacting a Ti-based oxide with a nitrogen precursor gas. Due to the reaction of the Ti-based oxide with the nitrogen precursor gas, nitrogen atoms penetrate into the surface of the Ti-based oxide core, to form Ti—N and N—O bonds. As a result, the titanium oxynitride is formed. The titanium oxynitride may coat all or a portion of the surface of the Ti-based oxide core.

According to an exemplary embodiment of the present invention, the nitrogen precursor gas may include an ammonium gas. However, the present invention is not limited thereto. For example, the nitrogen precursor gas may be any suitable gas including nitrogen.

According to another exemplary embodiment of the present invention, the Ti-based oxide may be $TiO_2$, $Li_{4+x}Ti_5O_{12}$ (−0.3<x<0.3), or the like. However, the present invention is not limited to the above examples. For example, the Ti-based oxide may be any suitable Ti-based oxide. The $Li_{4+x}Ti_5O_{12}$ may be doped with at least one element selected from the group consisting of Mg, Al, V, and Nb, at 10 at %. The element can be doped into a titanium site of the $Li_{4+x}Ti_5O_{12}$.

According to another exemplary embodiment of the present invention, the reaction of the Ti-based oxide with the nitrogen precursor gas may be performed at a temperature of about 500 to 800° C. However, the present invention is not limited to this temperature range. For example, the reaction temperature may be any appropriate temperature.

According to another exemplary embodiment of the present invention, the reaction of the Ti-based oxide with the nitrogen precursor gas may be performed for about 10 to 60 minutes. However, the present invention is not limited to the reaction this time range. The longer the reaction time, the greater the amount of the titanium oxynitride that is formed on the surface of the Ti-based oxide core.

Aspects of the present invention also provide an anode including the anode active material. For example, the anode may be manufactured by molding a mixed anode material, including the anode active material and a binder, into a desired shape, or by coating the mixed anode material on a current collector, such as copper foil, or the like.

In particular, the mixed anode material is prepared, and then the mixed anode material may be directly coated on a copper foil current collector, to obtain an anode plate. Alternatively, the mixed anode material may be cast on a separate support, and then an anode active material film is separated from the support and laminated on the copper foil current collector, to obtain an anode plate. The anode is not limited to the examples described above.

The mixed anode material can include a conducting agent to improve charge/discharge characteristics. Any suitable conducting agent that reduces the resistance of an electrode may be added to the mixed anode material. In this regard, the conducting agent may be carbon black, graphite particulates, or the like.

Aspects of the present invention also provide a lithium battery employing the anode. The lithium battery may be manufactured in the following manner.

First, a cathode active material, a conducting agent, a binder, and a solvent are mixed to prepare a cathode active material composition. The cathode active material composition is directly coated on a metallic current collector and dried, to prepare a cathode plate. In an alternative embodiment, the cathode active material composition is cast on a separate support, and a film peeled off of the support is laminated on a metallic current collector, to prepare a cathode plate.

A lithium-containing metal oxide that is commonly used in the art may be used as the cathode active material. Examples of the lithium-containing metal oxide include $LiCoO_2$, $LiMn_xO_{2x}$ (x=1 or 2), $LiNi_{1-x}Mn_xO_2$ (0<x<1), or $LiN_{1-x-y}Co_xMn_yO_2$ (0≦x≦0.5 and 0≦y≦0.5). Specific examples of the lithium-containing metal oxides include compounds capable of intercalating and deintercalating of lithium ions, such as $LiMn_2O_4$, $LiCoO_2$, $LiNiO_2$, $LiFeO_2$, $V_2O_5$, TiS, MoS, or like. The conducting agent may be carbon black or graphite particulates. Examples of the binder include a vinylidene fluoride/hexafluoropropylene copolymer, polyvinylidene fluoride (PVDF), polyacrylonitrile, polymethyl methacrylate, polytetrafluoroethylene, mixtures of these materials, and styrene butadiene rubber. The solvent may be N-methyl-pyrrolidone, acetone, water, or the like. The amounts of the cathode electrode active material, the conducting agent, the binder, and the solvent are amounts generally used in the art.

The lithium battery may include a separator. The separator may be any separator that is commonly used for lithium batteries. The separator may be highly permeable to electrolyte ions and may have an excellent electrolyte-retaining ability. Examples of the separator include glass fiber, polyester, polyethylene, polypropylene, polytetrafluoroethylene (Teflon), or a combination thereof. The separator may be in a non-woven or a woven fabric form. In particular, a windable separator including polyethylene, polypropylene, or the like can be used. A separator that can retain a large amount of an organic electrolytic solution may be used.

A method of forming the separator will now be described. A polymer resin, a filler, and a solvent are mixed to prepare a separator composition. The separator composition is directly coated on an electrode and then dried, to form a separator film. Alternately, the separator composition can be cast onto a separate support, dried, detached from the separate support, and finally laminated on an upper portion of the electrode, thereby forming a separator film.

Any polymer resin that is commonly used for binding electrode plates in lithium batteries can be used. Examples of the polymer resin include a vinylidenefluoride/hexafluoropropylene copolymer, polyvinylidene fluoride (PVDF), polyacrylonitrile, polymethylmethacrylate, and a mixture thereof.

The lithium battery includes an electrolytic solution. The electrolytic solution is prepared by dissolving an electrolyte in a solvent. The solvent can be selected from the group consisting of propylene carbonate, ethylene carbonate, fluoroethylene carbonate, diethyl carbonate, methylethyl carbonate, methylpropyl carbonate, butylene carbonate, benzonitrile, acetonitrile, tetrahydrofuran, 2-methyltetrahydrofuran, γ-butyrolactone, dioxorane, 4-methyldioxorane, N,N-dimethyl formamide, dimethyl acetamide, dimethylsulfoxide, dioxane, 1,2-dimethoxyethane, sulforane, dichloroethane, chlorobenzene, nitrobenzene, dimethyl carbonate, methylisopropyl carbonate, ethylpropyl carbonate, dipropyl carbonate, dibutyl carbonate, diethylene glycol, dimethyl ether, and a mixture thereof.

The electrolyte may be a lithium salt, such as $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ where x and y are independently a natural number, LiCl, LiI, or a mixture thereof. The separator is interposed between the cathode plate and the anode plate, to form a battery assembly. The battery assembly is wound or folded and then sealed in a cylindrical or rectangular battery case. Then, the electrolyte solution is injected into the battery case to complete the manufacture of a lithium battery.

Alternatively, a plurality of battery assemblies may be stacked in a bi-cell structure and impregnated into an organic electrolyte solution. The resultant structure is put into a pouch and hermetically sealed, thereby completing the manufacture of a pouch-type lithium ion polymer battery.

Aspects of the present invention will now be described in more detail, with reference to the following examples. However, these examples are for illustrative purposes only and are not intended to limit the scope of the present invention.

Preparation of Anode Active Material

EXAMPLE 1

200 mg of $TiO_2$ ((Kanto Chemical) were placed in a silica tube furnace at room temperature, and argon gas (99.99% purity) was supplied thereto, to remove oxygen and moisture. To stabilize the flow of the argon gas, the argon gas was supplied for 30 minutes, and then the silica tube furnace was heated to 400° C., at a rate of 7.5° C./min. The temperature was maintained at 400° C. for 30 minutes, and then increased to 700° C., at a rate of 5° C./min. Subsequently, ammonia gas (99.98% purity) was supplied to the furnace at a flow rate of 30 cm$^3$/min, for 10 minutes, for nitration. After the nitration reaction was completed, the furnace was cooled, while the argon gas was continually supplied. As a result, an anode active material was obtained.

EXAMPLE 2

An anode active material was prepared in the same manner as in Example 1, except that the ammonia gas was supplied for 20 minutes.

EXAMPLE 3

An anode active material was prepared in the same manner as in Example 1, except that the ammonia gas was supplied for 30 minutes.

EXAMPLE 4

An anode active material was prepared in the same manner as in Example 1, except that 200 mg of $Li_4Ti_5O_{12}$ (nGimat) was used instead of $TiO_2$.

COMPARATIVE EXAMPLE 1

Un-nitrated $TiO_2$ (Kanto Chemical) was used as an anode active material.

COMPARATIVE EXAMPLE 2

Un-nitrated $Li_4Ti_5O_{12}$ (nGimat) was used as an anode active material.

Manufacture of Anode and Lithium Battery

EXAMPLE 5

82 mg of the anode active material (in powder form) prepared in Example 1, 10 mg of a carbon conducting agent (Super P), 8 mg of polyvinylidene fluoride (PVDF), and 1 ml of N-methylpyrrolidone (NMP) were mixed in an agate mortar, to prepare a slurry. The slurry was coated on a Cu current collector to a thickness of about 50 μm, using a doctor blade. The resultant was dried at room temperature, and then dried again at 110° C. in a vacuum, to manufacture an anode plate. The anode plate, a lithium metal as a counter electrode, PTFE as a separator, and an electrolytic solution obtained by dissolving 1.3 M of $LiPF_6$ in a mixed solvent of ethylene carbonate (EC), diethylene carbonate (DEC) and fluoroethylene carbonate (FEC) (volume ratio of 2:6:2), were combined to manufacture a CR-2016 size coin cell.

EXAMPLE 6

A coin cell was manufactured in the same manner as in Example 5, except that the anode was manufactured using the anode active material of Example 2, instead of the anode active material of Example 1.

EXAMPLE 7

A coin cell was manufactured in the same manner as in Example 5, except that the anode was manufactured using the anode active material of Example 3, instead of the anode active material of Example 1.

EXAMPLE 8

A coin cell was manufactured in the same manner as in Example 5, except that the anode was manufactured using the anode active material of Example 4, instead of the anode active material of Example 1.

COMPARATIVE EXAMPLE 3

A coin cell was manufactured in the same manner as in Example 5, except that the anode was manufactured using the anode active material of Comparative Example 1, instead of the anode active material of Example 1.

COMPARATIVE EXAMPLE 4

A coin cell was manufactured in the same manner as in Example 5, except that the anode was manufactured using the anode active material of Comparative Example 2, instead of the anode active material of Example 1.

EVALUATION EXAMPLE 1

XPS Test

An x-ray photoelectron spectroscopy (XPS) test was performed on each of the anode active materials of Examples 1 and 4. FIG. 1 is a graph showing the X-ray photoelectron spectroscopy (XPS) test results of the anode active material powder prepared in Example 1, and FIG. 2 is a graph showing XPS test results of anode active material prepared in Example 4. The anode active materials were in powder form.

As shown in FIGS. 1 and 2, the anode active materials, which were nitrated Ti-based oxides, had N—Ti and N—O bonds in N 1 s spectrum. Although not illustrated, the un-nitrated Ti-based oxides ($TiO_2$ and $Li_4Ti_5O_{12}$) exhibited only a Ti—O peak.

EVALUATION EXAMPLE 2

Charge and Discharge Test

The coin cells manufactured in Examples 5 through 7 and Comparative Example 3 were each charged with a current of 0.1 C, until the voltage of the cell reached 1.0 V (with respect to the Li metal). Then, the coin cells were each discharged with a constant current of 0.1 C (3 cycles), 0.5 C (3 cycles), and 1 C (4 cycles), until the voltage of the cells reached 3.0 V. The results are shown in FIG. 3.

Figure 4:
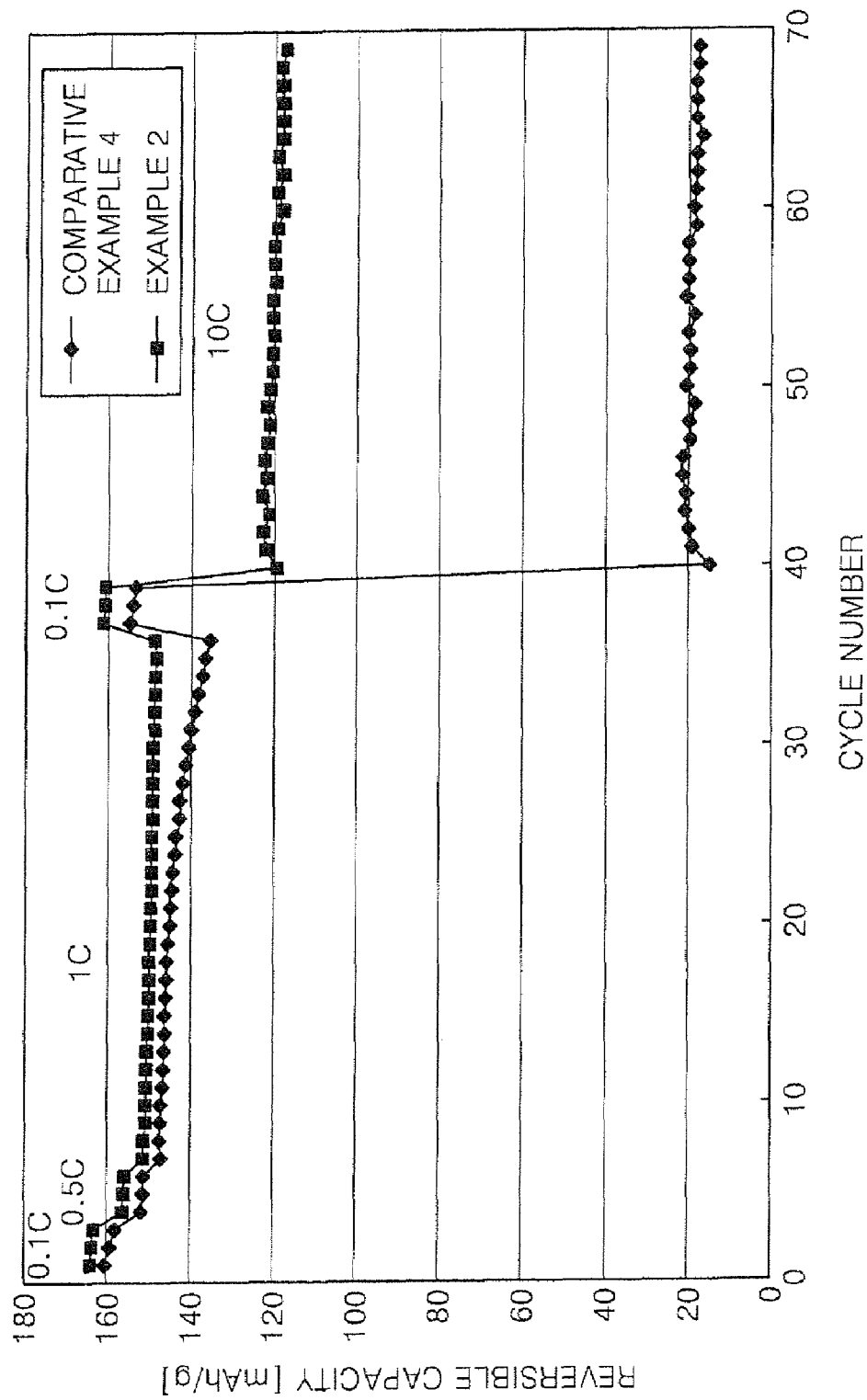
FIG. 4 is a graph showing charge and discharge test results of batteries manufactured in Example 8 and Comparative Example 4.
Figure 5:
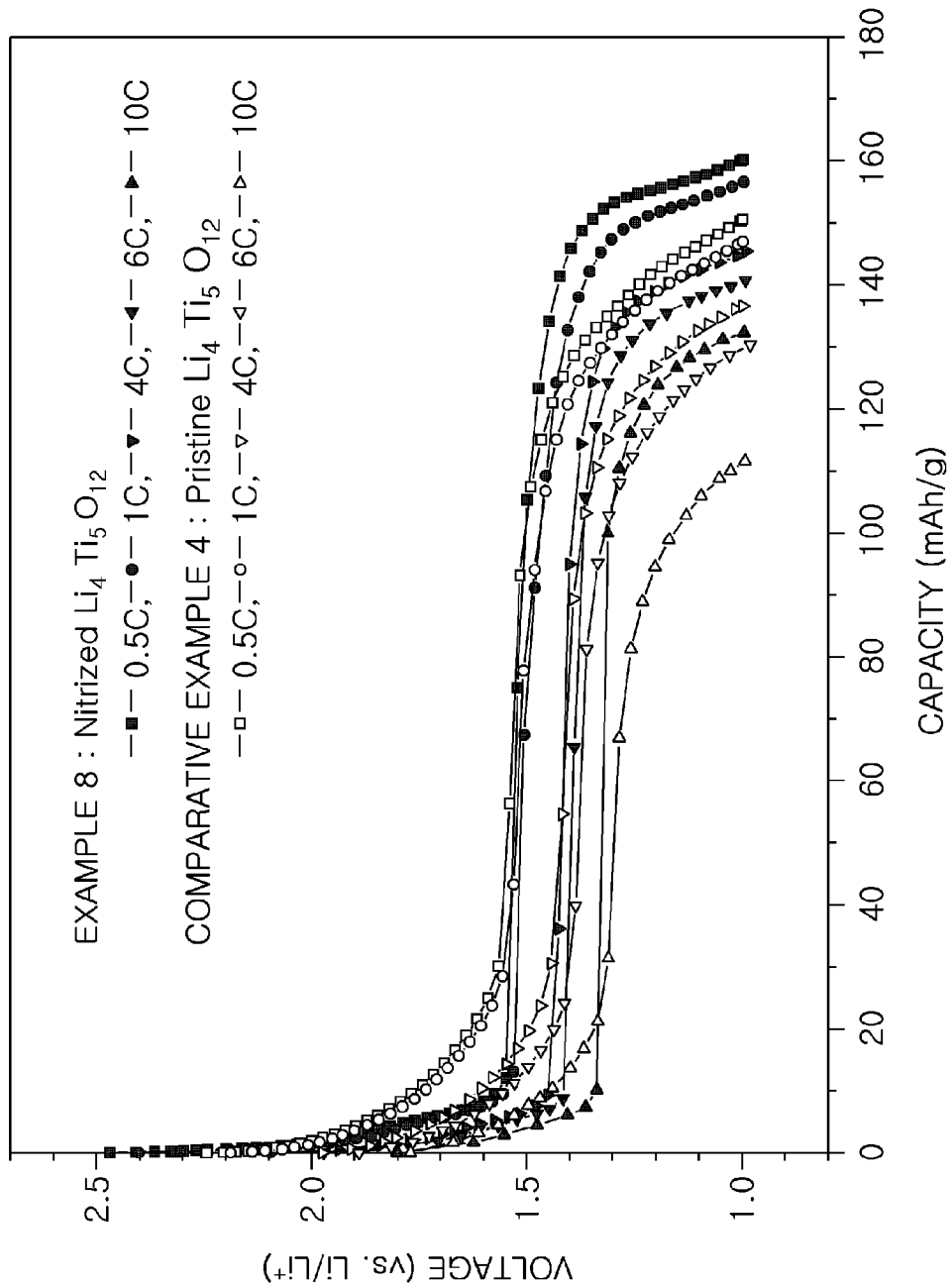
FIG. 5 is a graph of voltage curves when the batteries of Example 8 and Comparative Example 4 are charged.

The coin cells manufactured in Example 8 and Comparative Example 4 were each charged with a current of 0.1 C, until the voltage of the cell reached 1.0 V. Then, the coin cells were each discharged with a constant current of 0.1 C, 0.5 C, 1 C, and 10 C, until the voltage of the cell reached 3.0 V. The results are shown in FIG. 4. The coin cells of Example 8 and Comparative Example 4 were each charged with a current of 0.5 C, 1 C, 4 C, 8 C, and 10 C, until the voltage of the cell reached 1.0 V. Then, the coin cells were each discharged with a constant current of 0.1 C, until the voltage of the cell reached 3.0 V. A voltage curve of the charging rates described above, of the coin cells of Example 8 and Comparative Example 4, is shown in FIG. 5.

Figure 6:
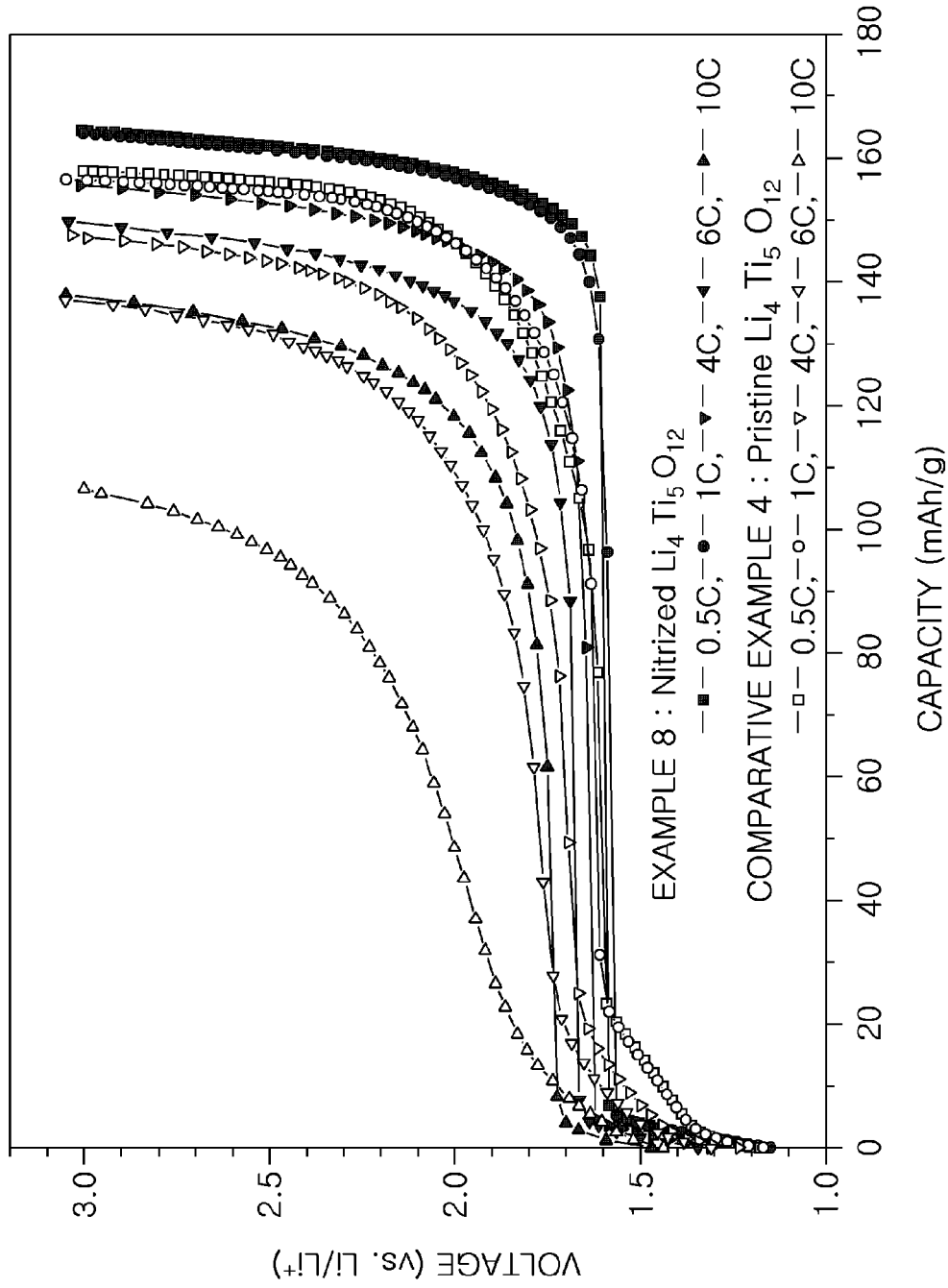
FIG. 6 is a graph of voltage curves when the batteries of Example 8 and Comparative Example 4 are discharged.

The coin cells of Example 8 and Comparative Example 4 were each charged with a current of 0.1 C, until the voltage of the cell reached 1.0 V. Then, the coin cells were each discharged with a constant current of 0.5 C, 1 C, 4 C, 6 C, and 10 C, until the voltage of the cell reached 3.0 V. Voltage curves at the discharging rates described above, of the coin cells of Example 8 and Comparative Example 4, are shown in FIG. 6.

Figure 3:
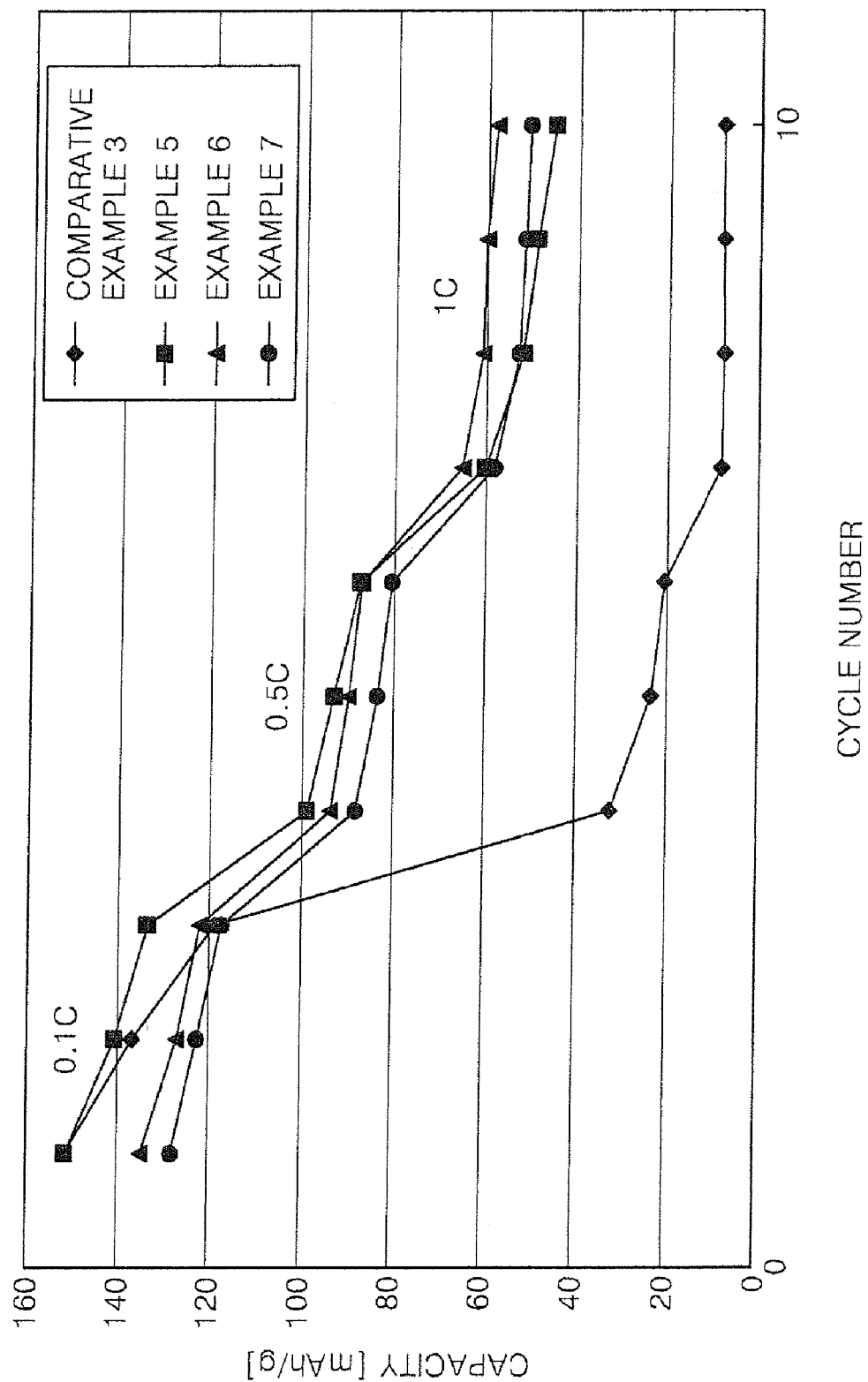
FIG. 3 is a graph showing charge and discharge test results of batteries manufactured in Examples 5 through 7 and Comparative Example 3.

As shown in FIG. 3, the coin cell of Comparative Example 3 (including the un-nitrated $TiO_2$) had an initial discharge capacity of 151 mAh/g, but the discharge capacity at 1 C was significantly decreased to 8 mAh/g. In contrast, the coin cells of Examples 5 through 7 (including the nitrated $TiO_2$) had a discharge capacity of 60 mAh/g at 1 C, and had improved high-rate discharge characteristics. In Examples 5 through 7, as the amount of the titanium oxynitride that was formed on the surface of the Ti-based oxide core increased, the high-rate discharge characteristics of each coin cell also increased.

As shown in FIG. 4, the coin cell of Comparative Example 4 (including the un-nitrated $Li_4Ti_5O_{12}$) had an initial discharge capacity of about 150 mAh/g, but the discharge capacity at 10 C was significantly decreased to 20 mAh/g. In contrast, the coin cell of Example 8 (including the nitrated $Li_4Ti_5O_{12}$) had a discharge capacity at 10 C, which had improved high-rate discharge characteristics.

The coin cell of Example 8 attained a lower reduction in capacity, according to the increase in the number of cycles at 1 C, as compared with the coin cell of Comparative Example 4. That is, the coin cell of Example 8 had improved cycle-life characteristics and a more stable capacity retention rate. As shown in FIGS. 5 and 6, the coin cell of Example 8 had a wider flat-band region around 1.5 V, a reduced over-potential, and an increased capacity, as compared with the coin cell of Comparative Example 4.

Although a few exemplary embodiments of the present invention have been shown and described, it would be appreciated by those skilled in the art that changes may be made in these exemplary embodiments, without departing from the principles and spirit of the invention, the scope of which is defined in the claims and their equivalents.

What is claimed is:

1. An anode active material comprising:
    Ti-based oxide core particles; and
    a titanium oxynitride coating formed on the surface of each of the Ti-based oxide core particles.
2. The anode active material of claim 1, wherein the surface of each of the Ti-based oxide core particles is completely covered by the titanium oxynitride.
3. The anode active material of claim 1, wherein the Ti-based oxide comprises $TiO_2$, $Li_{4+x}Ti_5O_{12}$ ($-0.3<x<0.3$), or a combination thereof.
4. The anode active material of claim 3, wherein the $Li_{4+x}Ti_5O_{12}$ is doped with Mg, Al, V, Nb, or a combination thereof, at 10 atomic percent or less.
5. The anode active material of claim 1, wherein the titanium oxynitride shows Ti—N and N—O bonding peaks during X-ray photoelectron spectroscopy (XPS).
6. The anode active material of claim 1, wherein the titanium oxynitride is represented by Formula 1 below:

$$TiO_yN_z\ (1<y<2, 0<z<1) \qquad \text{<Formula 1>}$$

7. An anode comprising the anode active material of claim 1.
8. A lithium battery comprising the anode according to claim 7.
9. An anode comprising the anode active material of claim 2.
10. An anode comprising the anode active material of claim 3.
11. An anode comprising the anode active material of claim 4.
12. An anode comprising the anode active material of claim 5.
13. An anode comprising the anode active material of claim 6.
14. An anode comprising a current collector coated with the anode active material of claim 1.
15. A method of preparing an anode active material, comprising reacting Ti-based oxide core particles with a nitrogen precursor gas, to form a titanium oxynitride coating on each of the Ti-based oxide core particles.
16. The method of claim 15, wherein the nitrogen precursor gas comprises ammonia.
17. The method of claim 15, wherein the Ti-based oxide comprises $TiO_2$, $Li_{4+x}Ti_5O_{12}$ ($-0.3<x<0.3$), or a combination thereof.
18. The method of claim 15, wherein the reacting of the Ti-based oxide with the nitrogen precursor gas is performed at a temperature of from about 500° C. to about 800° C.
19. The method of claim 15, wherein the reacting of the Ti-based oxide with the nitrogen precursor gas is performed for from about 10 to about 60 minutes.

* * * * *